No. 854,386. PATENTED MAY 21, 1907.
O. SCHULZ.
VEHICLE BRAKE.
APPLICATION FILED JUNE 4, 1906.

WITNESSES. INVENTOR.

UNITED STATES PATENT OFFICE.

OTTO SCHULZ, OF PITTSBURG, PENNSYLVANIA.

VEHICLE-BRAKE.

No. 854,386.        Specification of Letters Patent.        Patented May 21, 1907.

Application filed June 4, 1906. Serial No. 319,980.

*To all whom it may concern:*

Be it known that I, OTTO SCHULZ, a citizen of the United States, residing in the city of Pittsburg, in the county of Allegheny and State of Pennsylvania, have invented or discovered new and useful Improvements in Vehicle-Brakes, of which the following is a specification.

My invention consists in certain new and useful improvements in wagon and vehicle brakes and is especially applicable to that form of dump wagon wherein the load is deposited by the downwardly opening of doors which when closed form the bottom of the wagon bed. In this form of dump wagon it is impossible to use the ordinary form of wagon brake wherein the brake beam is placed transversely of the vehicle under the bed and in front of the rear wheels. In this form of dump wagon the brake beam is sometimes placed to the rear of and above the rear wheels and the braking pressure is downwardly and forwardly applied. This has not been a satisfactory arrangement as more pressure and force is required in such cases to gain the necessary amount of braking effect and the mechanism is cumbersome, costly and difficult of adjustment. Also the distance from the hand or foot lever to the brake shoes necessitates more force in application and is therefore more difficult to operate.

My invention provides a separate brake carrying mechanism which is independently attached to the sides of the wagon bed in front of the rear wheels and is so arranged and adjusted that the brake is applied to the wheel from the front as in the ordinary wagon where the greatest braking effect may be obtained from the minimum power required in application. These independent braking devices may be coupled together at the front of the vehicle out of the way of the dumping doors. My mechanism is readily adjustable to suit the varying axle lengths and bed widths of the different makes of wagons, and is of such simple and substantial construction that it is of little first cost and capable of long and rough usage without danger of breakage or deterioration from wear. It is easily installed without the aid of a skilled wagon maker and may be removed in a few moments without special tools. I provide a pivot standard capable of being bolted or otherwise rigidly secured to the wagon bed on which is pivoted a brake member or lever to one end of which is secured the brake shoe and to the other end pivoted the connecting rod to provide means of control from the driver's seat.

The different parts of my mechanism are novel and the assembling of parts described below provides a simple and effective method of securing the ends in view.

Figure 1:
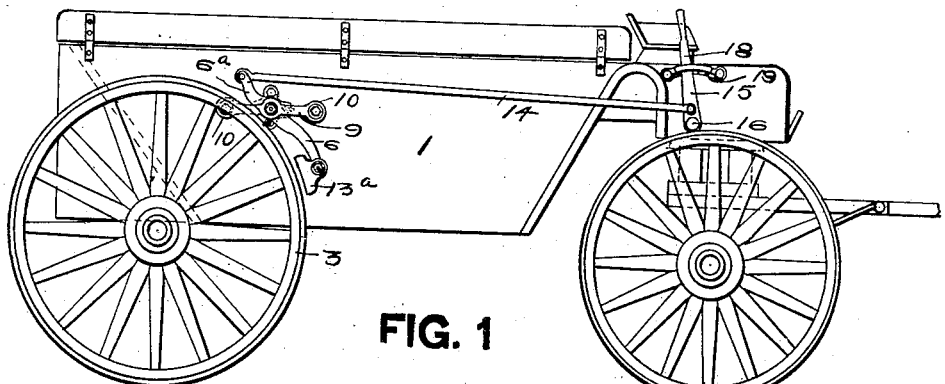
Figure 2:
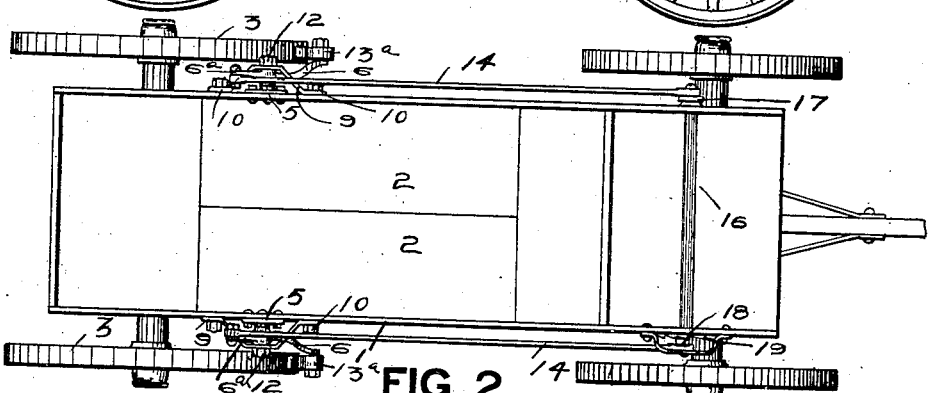
Figure 3:
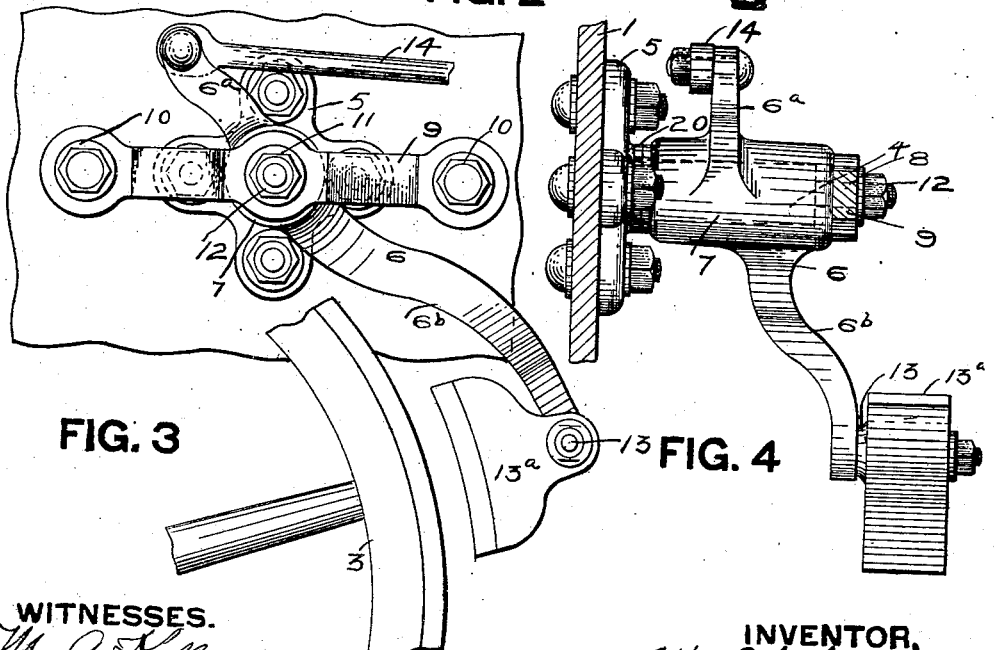
Figure 4:
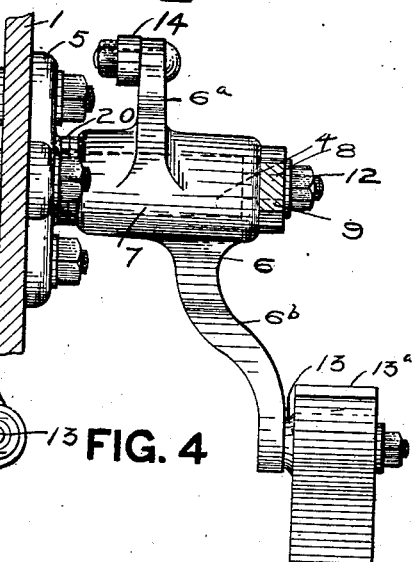

In the accompanying drawings, Figure 1 is a side elevation showing the right side of a wagon fitted with my invention, the brake being shown thrown off the wheel; Fig. 2 is a plan view of the same; Fig. 3 is an enlarged detail side elevation showing the mechanism illustrated in Fig. 1, and Fig. 4 is a rear view of the same, the strap brace being cut away for the sake of clearness.

The following is a detailed description of the drawings:—

1 is the wagon bed having bottom dumping doors 2—2.

3 is the rear wheel to which the brake is to be applied.

4 is a pivot standard, bolted or otherwise secured by means of its base 5 to the bed 1.

6 is the brake member or lever having its upper end 6$^a$ curved rearwardly as shown and its lower end, 6$^b$, curved rearwardly and outwardly as shown.

7 is a hub intermediate of the lever 6 and preferably cast integrally therewith. Said hub is bored centrally to be mounted on the pivot standard 4 as shown in the drawings, the hub being preferably of somewhat less length than the portion of said standard adapted to engage the same for the purpose of adjustment as will be explained. The outer end of said standard 4 is extended at less diameter as at 8 and provided with a threaded end.

9 is a strap brace bolted or otherwise secured as at 10—10 to the wagon bed and having at its center a hole 11 which engages the end of the standard 4 as shown. A nut 12 may then be screwed onto the end of the standard to keep the parts snugly in place.

To the lower end of the brake lever 6 is rigidly attached or made integral the spindle 13 upon which is mounted the brake shoe 13$^a$ in the usual manner. At the upper extremity of said lever 6 is pivoted the connecting rod 14 extending to the front of the wagon, where in case of the right hand brake, said rod is pivoted to the hand lever 15 a short distance above the lower end thereof. Said hand lever is attached rigidly at its lower end to the rock shaft 16 which is suitably journaled across the wagon bed adjacent to the driver's seat and in front of the loadbearing portion of the bed. At the other end of the shaft 16, at the left hand side of the bed, is a rigid crank 17 of a length substantially equal to the distance above the lower end of lever 15 marked by the pivot point of connecting rod 14. To the free end of crank 17 is pivoted the forward end of the connecting rod 14 of the left hand brake mechanism.

18 is a latch or pawl device carried by hand lever 15 and adapted to engage the teeth of the sector 19 attached to the wagon bed, so that said lever may be locked in any desired position to set or throw off the brake as may be desired.

As the varying widths of wagon beds and lengths of axles render necessary means for shifting the position of the lever 6 laterally to permit the brake shoe to properly engage the wheel tire, I provide washers 20—20 of a number sufficient for the purpose and shift the location of the lever 6 on standard 4 toward or away from the bed by introducing the washers in front or in the rear of the hub 7 as required, the hub 7 being preferably of less length than the standard 4, as explained, to permit of this adjustment. In Fig. 4 the hub is shown shifted outwardly by the washers 20—20 between it and the base of the standard.

It is evident that by regulating the size and number of the washers the lever may be located properly to bring the brake shoe to bear evenly on the tire.

It is evident from the above that my brake is simple and strong in construction so as to be both cheap and durable and renders possible the application of a forward or front brake on the type of dump wagon shown.

What I desire to claim is:—

1. In vehicle brakes, a pivot standard of varying diameter adapted to be secured to said vehicle in a horizontal position, a hub having a bore of varying diameter and adapted to be mounted on said standard and adjusted longitudinally thereon, a rearwardly and outwardly curved arm integral with said hub carrying a brake shoe at its extremity and an operating arm integral with said hub, substantially as described.

2. In vehicle brakes, a pivot standard, a hub adapted to engage said standard, a brace adapted to engage said standard outside of said hub and attached to the body of said vehicle and means for adjusting said hub longitudinally on said standard, substantially as described.

3. In vehicle brakes, a pivot standard having its outer extremity of a reduced diameter, a hub adapted to engage the portion of said standard adjacent to its base and of larger diameter, means for adjusting said hub longitudinally on said standard, a brace adapted to engage the reduced diameter of said standard and attached to the body of said vehicle and a brake lever carried by said hub, substantially as described.

Signed at Pittsburg, Pa., this 31st day of May, 1906.

OTTO SCHULZ.

Witnesses:
EDWARD A. LAURENCE,
J. H. HARRISON.